UNITED STATES PATENT OFFICE.

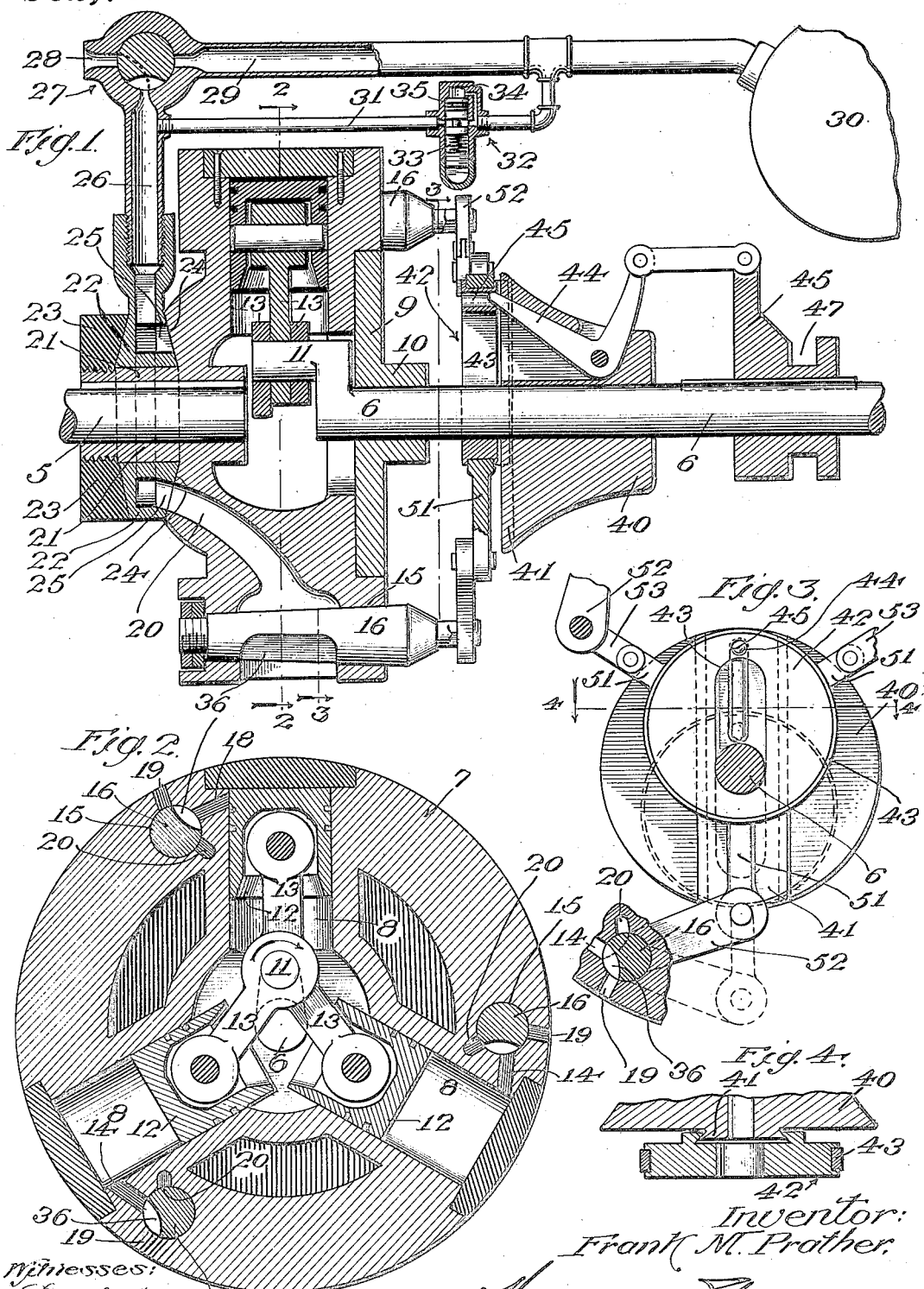

FRANK M. PRATHER, OF LOS ANGELES, CALIFORNIA.

CLUTCH.

No. 902,761.　　　Specification of Letters Patent.　　　Patented Nov. 3, 1908.

Application filed March 16, 1908. Serial No. 421,300.

*To all whom it may concern:*

Be it known that I, FRANK MONROE PRATHER, a citizen of the United States, residing at Los Angeles, in the county of Los Angeles and State of California, have invented new and useful Improvements in Clutches, of which the following is a specification.

This invention relates to a clutch particularly adapted for use in conjunction with explosion motors and especially for explosion motors on automobiles.

The prime object of this invention is to provide a mechanism which will take the place of the usual set of transmission gears and which will further provide means for starting the motor. In accomplishing this object two members are used, the one connected directly to the engine being ordinarily the driving member and the one connected to the vehicle wheels the driven member. On one of these members, preferably the driving member, is mounted a plurality of cylinders in which a corresponding plurality of pistons attached to the driven member are adapted to reciprocate. These pistons are eccentrically connected to the driven member while the cylinders are concentrically arranged around the axis of the driving member so that upon any relative rotation of the two members, the pistons will be reciprocated in the cylinders. By retarding the action of the pistons in the cylinders the driven member may be more or less rigidly locked to the driving member, and this retarding means is preferably furnished by the compression of a fluid, such as air, in the cylinders behind the pistons. Openings are provided which may be restricted and through which the air must pass from behind the pistons, and thus the amount of locking effort between the two members of the clutch may be regulated. Automatic valves are provided so that air is taken into the cylinders from the atmosphere and is pumped out through these restricted passageways. Connected with these passage-ways is a pressure reservoir into which air may be pumped during the operation of the clutch. When it is desired to start the engine it is only necessary to throw the air from this reservoir into the cylinders through the valves, which have been arranged for this purpose, and the clutch member connected to the engine may be rotated.

I accomplish the above by means of the device described herein and illustrated in the accompanying drawings, in which:—

Figure 1.— is a longitudinal section of my improved clutch with the parts in their locked or operative position. Fig. 2.— is a section taken on line 2—2 of Fig. 1. Fig. 3.— is a section taken on line 3—3 of Fig. 1. Fig. 4. —is a section taken on line 4—4 of Fig. 3.

In the drawings I have illustrated the clutch without any of the mechanism of an automobile on which it is preferably mounted, the operation of the parts being the same in whatever combination the clutch is placed, and will be understood without the illustration of any specific mechanism in connection therewith.

5 and 6 designate shafts which are continuations of each other, shaft 5 being ordinarily the driving shaft and shaft 6 the driven shaft. In the application of this clutch to an explosion motor shaft 5 is connected to the motor and shaft 6 to the mechanism driven thereby, such as the rear wheels of an automobile. Mounted on shaft 5, preferably keyed thereto, is a circular frame 7 forming the base of the driving member of the clutch. This frame is provided with a plurality of cylinders 8, preferably three in number and radially spaced around shaft 5. Frame 7 forms a hollow box of general cylindrical shape and is provided on its end with a cover plate 9 having a bearing 10 for shaft 6 therein. The inner end of shaft 6 projects into the interior of the frame and is provided with a crank 11 on its end. Pistons 12 are adapted to reciprocate in cylinders 8 and are connected to crank 11 by connecting rod 13, and, as the cylinders are concentrically arranged around shaft 5 as shown in Fig. 2, the pistons will be reciprocated in the cylinders upon any relative rotation of shafts 5 and 6. The remaining parts of the clutch consist particularly in the means to retard the reciprocation of the pistons in the cylinders, and it is in this construction that my invention lies. Each of cylinders 8 is provided with a port 14 leading to valve bore 15 in which a rotary valve 16 is placed. Leading also from valve bore 15 is a port 19 to the atmosphere and a port 20 leading through frame 7 to a point adjacent shaft 5 as shown in Fig. 1, this port being hereinafter termed the compression port. Frame 7 is provided with a sleeve 21 surrounding shaft 5 and a hollow ring 22 fits over this sleeve and is held thereon by a nut 23. Ring 22 is stationary while the sleeve and nut revolve with frame 7 and shaft 5, the sleeve bearing snugly against surface 24 at its inner side. Compression ports 20 emerge on this surface and ring 22 is provided with ports 25 leading from its hollow interior to its inner surface, so that a direct communication is formed through the ring between ports 20 and pipe 26 connected to the ring.

Pipe 26 is provided with a three way valve 27 adapted to either connect the pipe with the atmosphere through outlet 28 or with pipe 29 leading directly to pressure reservoir 30. Leading around valve 27 is a small by-pass pipe 31 provided with a pressure regulating valve 32. This pressure regulating valve is provided with an adjustable spring 33 counteracting the air pressure in cylinder 34 behind piston valve 35 which will operate to close the connection through the valve upon the pressure in reservoir 30 reaching a point high enough to overpower spring 33. Valve stoppers 16 are identical in construction and in operation for all three valves. Each is provided with a port 36 on its face adapted to connect port 14 with either port 19 or port 20. In the position shown in the drawings ports 14 and 19 are connected together in the lower left hand valve in Fig. 2, it being assumed that crank 11 is traveling in the direction indicated by the arrow and that piston 12 for this valve is drawing in air from the atmosphere.

Mounted rigidly upon shaft 6 is a hub 40 carrying a slide 41 on its face toward the clutch upon which an eccentric 42 is adapted to be operated. This eccentric is provided with a slot 43 encircling shaft 6 and acting as a stop to its movement on slide 41. Mounted on hub 40 is a pivoted arm 44 which enters a depression 45 in the eccentric so that the eccentric may be moved on slide 41 by the movement of arm 44. Arm 44 is connected to a slider 45 which is loosely keyed to shaft 6 and is provided with a groove 47 for connection with any approved operating means to move it along the shaft. It will be seen that, by a movement of slider 45, the eccentric may be thrown into diametrically opposite positions, so that the actions of the valves connected thereto will be reversed and the whole mechanism operated in a reverse direction of rotation. Eccentric 42 is provided with a strap 50 connected to three arms 51, one of these arms, the lower one, connecting directly with lever 52 for lower valve 16, the others connecting with the upper valve levers through toggle arms 53. This construction provides at once for the retaining of the eccentric strap in a fixed position and for operative connections between the eccentric and the valves.

Eccentric 42 is so placed on shaft 6 in relation to the position of crank 11 that valves 16 are moved in proper relation to the movements of their respective pistons. This movement throws the valve into the position shown for the lowermost valve in Fig. 2, connecting the cylinder to atmosphere, while the piston moves inwardly. On the outward stroke of the piston the valve is rotated to connect the cylinder with the compression port as shown for the right hand valve in Fig. 2, and air is forced into pipe 26. When the eccentric is thrown to its dotted position the action of the valves is reversed and air is taken in from the compression port and discharged to the atmosphere. In this position when fluid pressure is supplied to the compression ports, the clutch acts as a motor, taking its feed from the compression ports and exhausting to atmosphere.

In the operation of my improved clutch it will be presumed that shaft 5 is in rotation, or, in an automobile construction, that the engine has been started and that shaft 6, connected with the traction wheels, is at rest. In this condition valve 27 stands on the position shown in dotted lines and the piston operates to draw in air from the atmosphere and to force it out through pipe 26 and outlet 28. Valve 27 is then gradually thrown into the position shown in full lines and the pistons immediately begin to pump against an increasing pressure in pipe 26. An increasing rotary force is thereby placed upon the shaft 6 which begins to revolve more and more rapidly against the retardation of whatever mechanism it is connected to at its other end. When the valve has reached the position shown in full lines the pistons cease to reciprocate in the cylinders as they soon pump up a pressure in pipe 26 and ports 20 sufficient to rigidly lock shafts 5 and 6 together and transmit power from one to the other. A small amount of this pressure is allowed to pass through pipe 31 and valve 32 to reservoir 30 until the reservoir is filled to the pressure for which valve 32 is set, the connection through the valve then being cut off by the enforced downward movement of piston valve 35.

When it is desired to start shaft 5 and the engine connected thereto, it is first necessary to hold shaft 6 from rotation, which may be easily done in an automobile construction by braking the rear wheels. The position of the eccentric is then reversed so that the pistons and valves operate in a relative manner opposite to the normal. Valve 27 is thrown into its position to connect pipes 29 and 26 and pressure is admitted to valves 16 to operate pistons 12 in cylinders 8. The clutch then operates as a fluid pressure motor, the cylinders being rotated and with them shaft 5 and the engine connected thereto. As soon as the engine has been started, shaft 6 is unlocked and may then be connected to shaft 5 as before explained.

Having described my invention, what I claim as new and desire to secure by Letters Patent is:—

1. A clutch comprising a driving and a driven shaft, a plurality of cylinders mounted on one of said shafts, a plurality of pistons mounted on the other of said shafts to reciprocate in said cylinders on the relative rotation of the shafts, valves for said cylinders mounted thereon, and adjustable eccentric means actuated by the piston shaft to operate said valves.

2. A clutch comprising a driving and a driven member, a cylinder mounted on said driving member, a piston mounted on said driven member and reciprocating in said cylinder, a valve for said cylinder mounted thereon and having port connection therewith, said valve also provided with a port to atmosphere and a third adjustably restricted port, and reversible means to operate said valve by the relative movement of said driving and driven members to alternately connect the cylinder port with the atmosphere and restricted ports.

3. A clutch comprising a driving and a driven member, a cylinder mounted on said driving member, a piston mounted on said driven member and adapted to reciprocate in said cylinder upon the relative movement of the two members, a valve for said cylinder mounted thereon and having port connection therewith, said valve also provided with a port to atmosphere and with a third compression port, a pressure storage chamber, means to connect said compression port to said storage chamber or to atmosphere, and reversible means on said driven member to operate said valve to connect the atmosphere and the compression port alternately to the port leading to said cylinder.

4. A clutch comprising a driving and a driven member, coöperating means on said members for compressing a fluid, a valve operated by the relative movements of said members to control the fluid, storage means for the compressed fluid, and means to adjust and reverse said valve in relation to said compressing means.

In witness that I claim the foregoing I have hereunto subscribed my name this 6th day of March, 1908.

FRANK M. PRATHER.

Witnesses:
EDMUND A. STRAUSE,
OLLIE PALMER.